(12) United States Patent
Feris et al.

(10) Patent No.: US 8,107,678 B2
(45) Date of Patent: Jan. 31, 2012

(54) DETECTION OF ABANDONED AND REMOVED OBJECTS IN A VIDEO STREAM

(75) Inventors: Rogerio Schmidt Feris, White Plains, NY (US); Arun Hampapur, Norwalk, CT (US); Zuoxuan Max Lu, Yorktown Heights, NY (US); Ying-li Tian, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 982 days.

(21) Appl. No.: 12/053,827

(22) Filed: Mar. 24, 2008

(65) Prior Publication Data

US 2009/0238462 A1    Sep. 24, 2009

(51) Int. Cl.
*G06K 9/00* (2006.01)
(52) U.S. Cl. ....................................................... 382/103
(58) Field of Classification Search .................. 382/103, 382/104, 173
See application file for complete search history.

(56) References Cited

U.S. PATENT DOCUMENTS

| | | |
|---|---|---|
| 2004/0062439 A1 | 4/2004 | Cahill et al. |
| 2004/0151342 A1 | 8/2004 | Venetianer et al. |
| 2005/0036658 A1 | 2/2005 | Gibbins et al. |
| 2005/0271280 A1 | 12/2005 | Farmer et al. |
| 2007/0160286 A1 | 7/2007 | Haque |
| 2007/0195993 A1* | 8/2007 | Chen et al. ............... 382/103 |
| 2009/0067716 A1* | 3/2009 | Brown et al. ............. 382/173 |

OTHER PUBLICATIONS

Office Action (Mail Date Jul. 27, 2011) for U.S. Appl. No. 12/054,717, filed Mar. 25, 2008; Confirmation No. 6591.
Sacchi et al.; A Distributed Surveillance System for Detection of Abandoned Objects in Unmanned Railway Environments; IEEE Transactions on Vehicular Technology, vol. 49, No. 5, Sep. 2000; pp. 2013-2026.
Tian et al.; Robust and Efficient Foreground Analysis for Real-time Video Surveillance; Proceedings of the 2005 IEEE Computer Society Conference on Computer Vision and Pattern Recognition (CVPR'05); 6 pages.
Lisa M. Brown; View Independent Vehicle/Person Classification; VSSN'04, Oct. 15, 2004, New York, New York, USA; Copyright 2004 ACM; 10 pages.
Stauffer et al.; Adaptive background mixture models for real-time tracking; 1999 IEEE; pp. 246-252.

* cited by examiner

*Primary Examiner* — Claire X Wang
(74) *Attorney, Agent, or Firm* — Schmeiser, Olsen & Watts; Anna Linne

(57) ABSTRACT

A method for processing a time-ordered sequence of video frames. The method is implemented by execution of program code on a processor of a computer system. Each frame includes a two-dimensional array of pixels and a frame-dependent color intensity at each pixel. A current frame and at least one frame occurring prior to the current frame in the sequence are analyzed via a background subtraction on the at least one frame to determine a background image and a static region mask associated with a static region. The background subtraction determines an existence of a static object relating to the static region. A status of the static object is determined, the status being either that the static object is an abandoned object or that the static object is a removed object. The determined status is stored in a data storage medium of the computer system.

25 Claims, 14 Drawing Sheets

DETECTION OF ABANDONED AND REMOVED OBJECTS IN A VIDEO STREAM

RELATED APPLICATION

This application is related to U.S. patent application Ser. No. 12/054,717 filed on Mar. 25, 2008 and entitled "REAL TIME PROCESSING OF VIDEO FRAMES FOR TRIGGERING AN ALERT."

FIELD OF THE INVENTION

The present invention relates generally to processing video frames of a video stream and more particularly to detecting abandoned and removed objects in the video stream.

BACKGROUND OF THE INVENTION

Current methods for detecting abandoned and removed objects in video streams are ineffective, especially in complex and/or crowded environments. Thus, there is a need for a more effective method and system for detecting abandoned and removed objects in a video stream than currently exists in the related art.

SUMMARY OF THE INVENTION

The present invention provides a method for processing a time-ordered sequence of video frames, each frame comprising a two-dimensional array of pixels and a frame-dependent color intensity at each pixel, said method implemented by execution of program code on a processor of a computer system, said method comprising:

analyzing a current frame and at least one frame occurring prior to the current frame in the sequence, said analyzing comprising performing a background subtraction on the at least one frame to determine a background image and a static region mask associated with a static region, said background image comprising the array of pixels and a background model of the at least one frame and not comprising any moving object, said static region consisting of a contiguous distribution of pixels of the array of pixels, said analyzing determining an existence of a static object consisting of either an abandoned object existing in the static region of the current frame and not existing in the static region of the background image or a removed object existing in the static region of the background image and not existing in the static region of the current frame;

after said analyzing, determining a status of the static object, said status being an abandoned status if the static object is said abandoned object or a removed status if the static object is said removed object, said determining the status comprising executing an A/R algorithm that uses the current frame, the background image, and the static region mask as input and does not use any other information derived from the background subtraction as input; and storing the determined status in a data storage medium of the computer system.

The present invention provides a computer program product, comprising a computer usable storage medium having a computer readable program code stored therein, said computer readable program code comprising an algorithm adapted to implement a method for processing a time-ordered sequence of video frames, each frame comprising a two-dimensional array of pixels and a frame-dependent color intensity at each pixel, said method implemented by execution of program code on a processor of a computer system, said method comprising:

analyzing a current frame and at least one frame occurring prior to the current frame in the sequence, said analyzing comprising performing a background subtraction on the at least one frame to determine a background image and a static region mask associated with a static region, said background image comprising the array of pixels and a background model of the at least one frame and not comprising any moving object, said static region consisting of a contiguous distribution of pixels of the array of pixels, said analyzing determining an existence of a static object consisting of either an abandoned object existing in the static region of the current frame and not existing in the static region of the background image or a removed object existing in the static region of the background image and not existing in the static region of the current frame;

after said analyzing, determining a status of the static object, said status being an abandoned status if the static object is said abandoned object or a removed status if the static object is said removed object, said determining the status comprising executing an A/R algorithm that uses the current frame, the background image, and the static region mask as input and does not use any other information derived from the background subtraction as input; and storing the determined status in a data storage medium of the computer system.

The present invention provides a computer system comprising a processor and a computer readable memory unit coupled to the processor, said memory unit containing instructions that when executed by the processor implement a method for processing a time-ordered sequence of video frames, each frame comprising a two-dimensional array of pixels and a frame-dependent color intensity at each pixel, said method implemented by execution of program code on a processor of a computer system, said method comprising:

analyzing a current frame and at least one frame occurring prior to the current frame in the sequence, said analyzing comprising performing a background subtraction on the at least one frame to determine a background image and a static region mask associated with a static region, said background image comprising the array of pixels and a background model of the at least one frame and not comprising any moving object, said static region consisting of a contiguous distribution of pixels of the array of pixels, said analyzing determining an existence of a static object consisting of either an abandoned object existing in the static region of the current frame and not existing in the static region of the background image or a removed object existing in the static region of the background image and not existing in the static region of the current frame;

after said analyzing, determining a status of the static object, said status being an abandoned status if the static object is said abandoned object or a removed status if the static object is said removed object, said determining the status comprising executing an AIR algorithm that uses the current frame, the background image, and the static region mask as input and does not use any other information derived from the background subtraction as input; and storing the determined status in a data storage medium of the computer system.

The present invention provides a process for supporting computer infrastructure, said process comprising providing at least one support service for at least one of creating, integrating, hosting, maintaining, and deploying computer-readable program code in a computing system, wherein the program code in combination with the computing system is configured to perform a method for processing a time-ordered sequence of video frames, each frame comprising a two-dimensional array of pixels and a frame-dependent color intensity at each pixel, said method implemented by execution of program code on a processor of a computer system, said method comprising:

analyzing a current frame and at least one frame occurring prior to the current frame in the sequence, said analyzing comprising performing a background subtraction on the at least one frame to determine a background image and a static region mask associated with a static region, said background image comprising the array of pixels and a background model of the at least one frame and not comprising any moving object, said static region consisting of a contiguous distribution of pixels of the array of pixels, said analyzing determining an existence of a static object consisting of either an abandoned object existing in the static region of the current frame and not existing in the static region of the background image or a removed object existing in the static region of the background image and not existing in the static region of the current frame;

after said analyzing, determining a status of the static object, said status being an abandoned status if the static object is said abandoned object or a removed status if the static object is said removed object, said determining the status comprising executing an A/R algorithm that uses the current frame, the background image, and the static region mask as input and does not use any other information derived from the background subtraction as input; and storing the determined status in a data storage medium of the computer system.

The present invention provides a more effective method and system for detecting and detecting abandoned and removed objects in a video stream than currently exists in the related art.

DETAILED DESCRIPTION OF THE INVENTION

Figure 1:
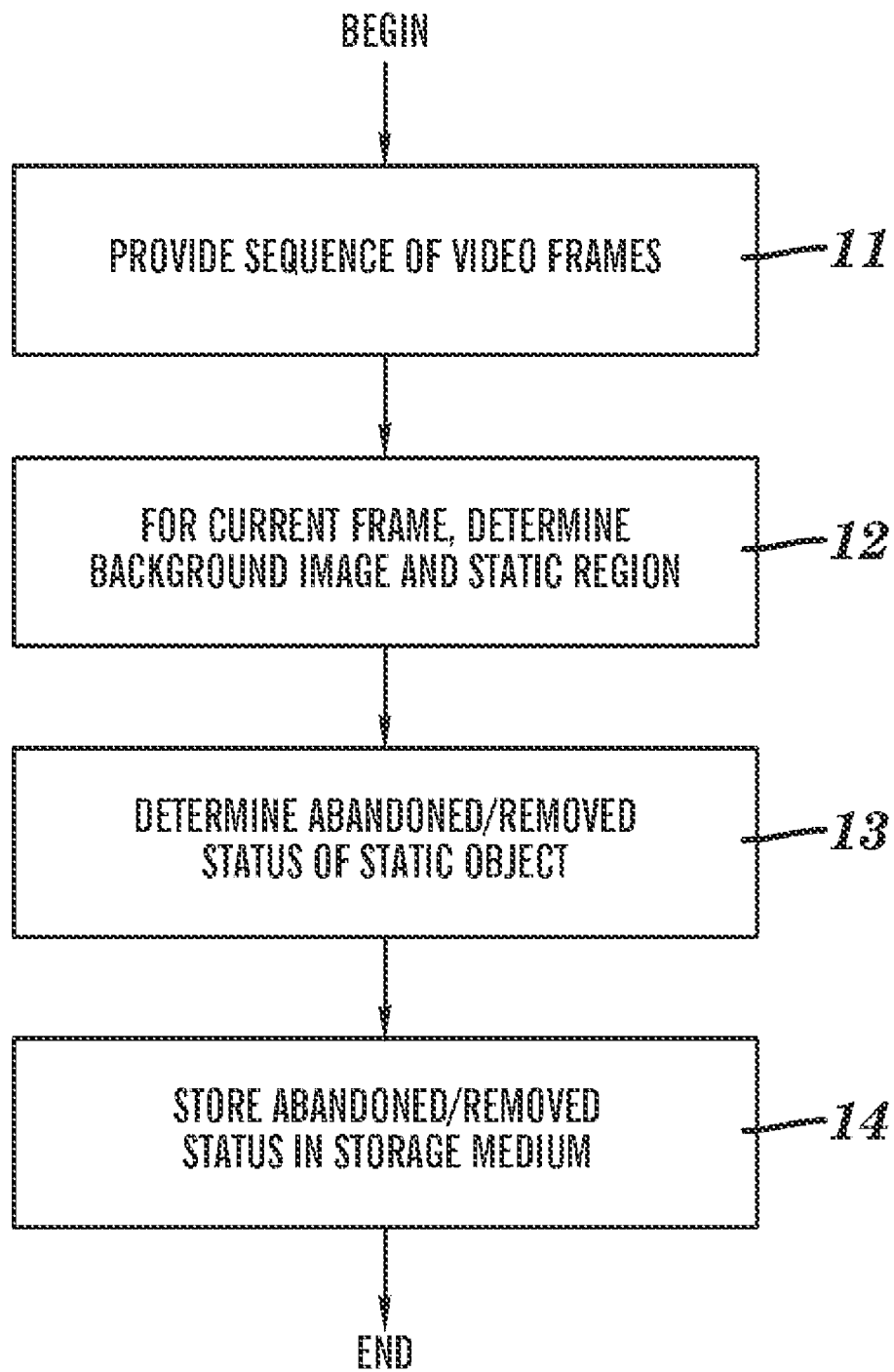
FIG. 1 is a flow chart depicting a method for processing a time-ordered sequence of video frames of a video stream, including performing an abandoned/removed object detection algorithm (AIR algorithm) for determining an abandoned/removed status of a static object, in accordance with embodiments of the present invention.

FIG. 1 is a flow chart depicting a method for processing a time-ordered sequence of video frames of a video stream, in accordance with embodiments of the present invention. The method may be implemented by execution of program code on a processor of a computer system, such as the computer system 90 depicted in FIG. 14 and described infra. FIG. 1 depicts steps 11-14.

Step 11 provides the video stream that includes a time-ordered sequence of video frames. In one embodiment, the video stream may be a real time video stream. In one embodiment, the video stream may be received from a video camera connected to a video adapter on a typical state of the art computer or personal computer (PC), provided over a network (e.g., the Internet) as a multimedia file in a multimedia format (e.g., in avi, mpeg, wmv, and etc.). Each frame of the video stream comprises a two-dimensional array of pixels.

Each pixel of the two-dimensional array of each frame has a color intensity. In one embodiment, the color intensity is RGB-based such that the color intensity is a combination of a color intensity of red, a color intensity of green, and a color intensity of blue. In one embodiment, the color intensity is based on shades of gray. Since the spectrum of shades of gray is a subset of the spectrum of RGB, use of "color, "color intensity", etc. is applicable to both RGB and shades of gray.

Step 12 processes a current frame, which may be any frame of the video stream after the first frame. Step 12 analyzes the current frame and a set of frames preceding the current frame in the video sequence, using a background subtraction algorithm on the set of frames to determine, inter alia, a background image, a foreground mask, one or more static regions, and a static region mask associated with each static region of the one or more static regions. The set of frames consists of one or more frames occurring prior to the current frame.

The background image comprises the two-dimensional array of pixels and a background model of the at least one frame prior to the current frame and does not comprise any moving object. Thus, the background image represents a portion of an image that has been static for a period of time. For example, the background image may include a parking lot and cars that have been therein for a period of time, wherein the period of time may be defined by a user.

Foreground refers to a portion of an image that is changing over the period of time and thus comprises one or more moving objects. For example, the foreground may comprise cars being driven in a parking lot. A foreground mask is a binary representation (e.g., 0 or 1) of a foreground, wherein "1" denotes pixels on a frame containing foreground content consisting of moving object content and "0" denotes pixels of the frame not including foreground content.

A static region comprises a contiguous distribution of pixels that is in a spatially fixed region of a frame. A static object represented by a static region is an abandoned object or a removed object. An abandoned object represented by a static region in a given frame is an object that physically exists in the static region in the given frame, but does not physically exist in the static region in frames preceding the given frame (e.g., a recently parked car in a parking lot). A removed object represented by a static region in a given frame is an object that does not physically exist in the static region in the given frame, but does physically exist in static region in frames preceding the given frame (e.g., a car recently driven out of a parking lot).

A static region mask for each static region is a binary representation (e.g., 0 or 1), wherein a pixel comprising "1" denotes that the pixels are in the static region and pixel comprising "0" denote pixels outside of the static region. Thus, a static region mask superimposed on a frame identifies the pixels in the frame that define the static region in the frame that is associated with the static mask.

The analysis performed in the background subtraction of step 12 determines an existence of a static object, which is either: (1) an abandoned object existing in the static region of the current frame and not existing in the static region of the background image; or (2) a removed object existing in the static region of the background image and not existing in the static region of the current frame.

There are various background subtraction processes known in the art and any known currently or subsequently known background subtraction process may be used to implement step 12. One such background subtraction process that may be beneficially employed is a "mixture of Gaussians" algorithm (see paper Ying-Li Tian, Max Lu, and Arun Hampapur, "Robust and Efficient Foreground Analysis for Real-time Video Surveillance," IEEE CVPR, San Diego. June, 2005) to generate the background model, the foreground image, and static regions.

The mixture of Gaussian algorithm utilizes K Gaussian functions coupled together in a linear combination by Gaussian weight coefficients to define a pixel color intensity probability function. In one embodiment, K is in a range of 3 to 5. The conventional mixture of Gaussian algorithm uses a single weight threshold that provides a lower bound for a sum of the Gaussian weight coefficients for identifying foreground and static regions. If the threshold has a high value, its categorization would result in fragmented foreground or static regions.

Therefore, the present invention provides a novel improvement to the conventional mixture of Gaussian algorithm by using two weight thresholds: a high value weight threshold to identify foreground and a low value weight threshold to identify static regions. The two weight thresholds ensures that a static region is not unnecessarily fragmented due to a high threshold value. In particular, the background subtraction constrains a sum of the Gaussian weight coefficients for identifying the foreground image to exceed the high weight threshold and constrains a sum of the Gaussian coupling coefficients for identifying the static region to exceed a low weight threshold. The high weight threshold is sufficiently high and the low weight threshold is sufficiently low to ensure that the foreground image is adequately identified and the static region is not excessively fragmented.

A novel improvement of the present invention in application to background subtraction is the use of timestamps to select the set of frames occurring prior to the current frame. Conventional background subtraction methods update the background image based on input of specified frames and a predefined update rate parameter. In the present invention, the background image may be updated at different speeds for video streams having different frame rates, even though the update rate parameter is constant. In real-time surveillance systems, the video frame rate often changes dramatically even for the same camera view due to multiple engines running on one machine and the complexity of the scenario. Thus in one embodiment, use of the mixture of Gaussians method in application to the present invention comprises: receiving an input of time data prescribing at least one timestamp; and determining at least one frame occurring prior to the current frame by selecting, for each timestamp of the at least one timestamp, a frame whose frame time is closest to the time of each timestamp. The at least one timestamp may consist of one timestamp or a plurality of timestamps. The at least one frame occurring prior to the current frame determined in the preceding manner is used to generate or update the background image.

Step 13 determines a status of the static object associated with the static region identified in step 12. The status of the static object is an abandoned status if the static object is an abandoned object or a removed status if the static object is a removed object. Step 13 determines the status of the static object by executing an abandoned/removed algorithm (hereinafter, "A/R algorithm") that uses a current frame, the background image, and the static region as input and does not use any other information derived from the background subtraction as input. Implementation of the A/R algorithm is described in detail infra in FIG. 2.

Step 14 stores the status of the static object, as determined in step 13, in a data storage medium of a computer system (e.g., the computer system 90 depicted in FIG. 14) and/or provides the determined status of the static object to an output device of the computer system, such as a data storage device, a display device, etc.

Figure 2:
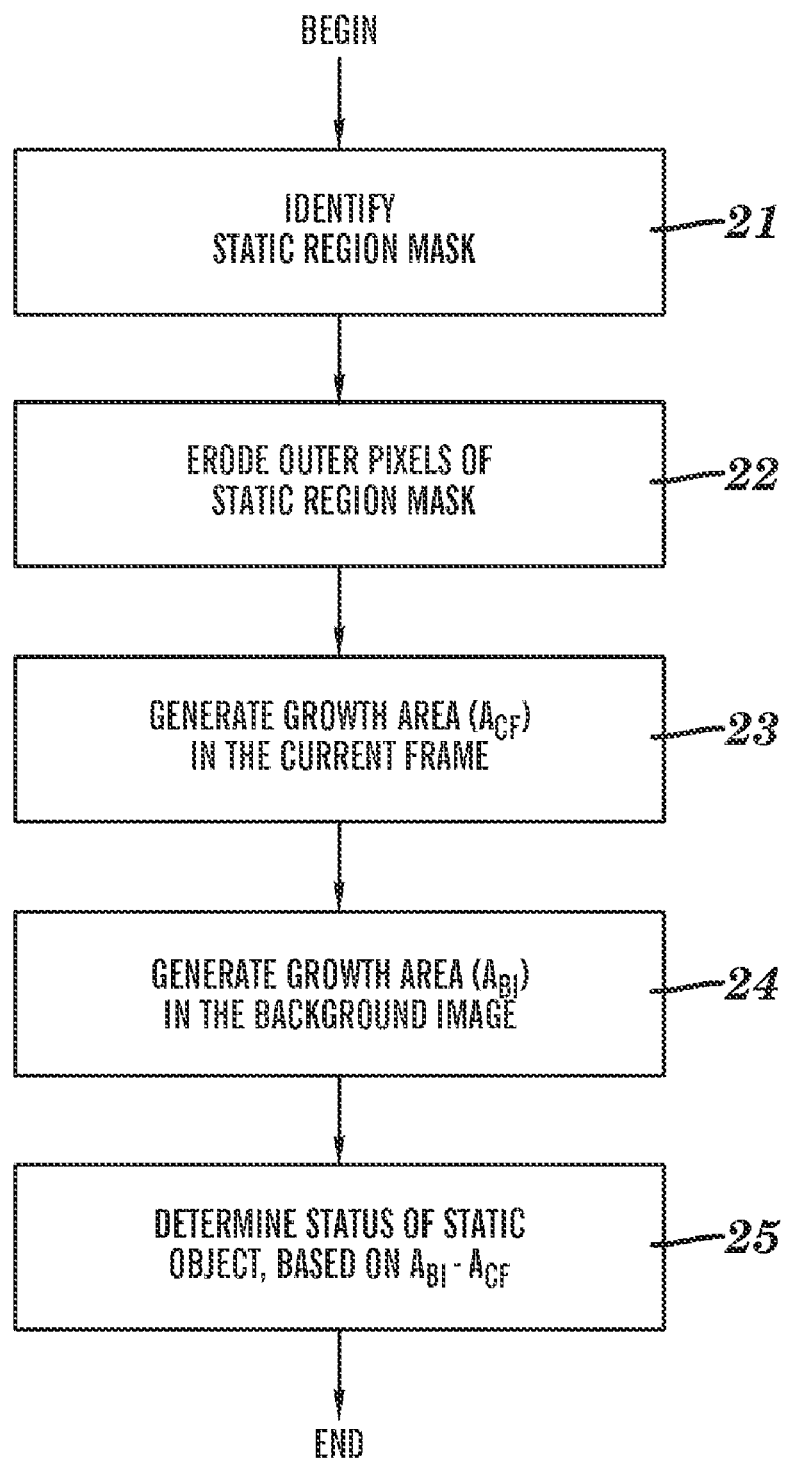
FIG. 2 is a flow chart depicting implementation of the A/R algorithm of FIG. 1, including performing a region growing procedure for both a current frame and a background image of the video stream, in accordance with embodiments of the present invention.

FIG. 2 is a flow chart depicting implementation of the A/R algorithm of step 13 of FIG. 1, in accordance with embodiments of the present invention. FIG. 2 depicts steps 21-25.

Step 21 identifies a static region mask resulting from the background subtraction of step 12 of FIG. 1.

Step 22 erodes outer pixels of the static region mask identified in step 21, leaving remaining non-eroded pixels of the static region mask, wherein boundary pixels of the non-eroded pixels consist of all non-eroded pixels directly exposed to at least one eroded pixel. The boundary pixels are bounded by a contour that serves as in interfacial boundary between the boundary pixels and the eroded pixels.

Figure 3:
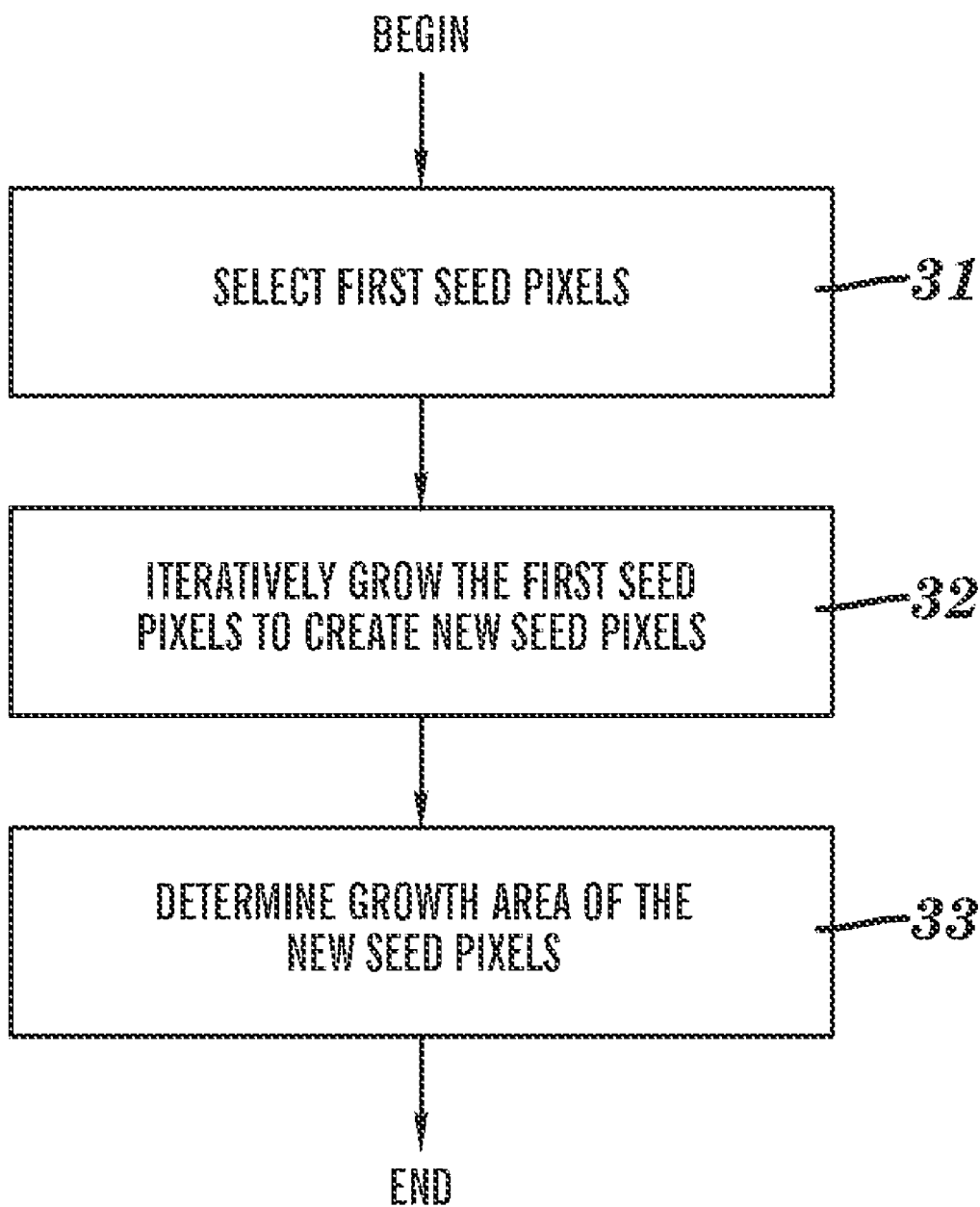
FIG. 3 is a flow chart depicting implementation of the region growing procedure of FIG. 2, in accordance with embodiments of the present invention.

Step 23 generates a growth area ($A_{CF}$) in the current frame via execution of a region growing procedure described infra in conjunction with FIG. 3 which utilizes the non-eroded pixels resulting from step 22.

Step 24 generates a growth area ($A_{BI}$) in the background image via execution of the region growing procedure of FIG. 3 which utilizes the non-eroded pixels resulting from step 22.

Step 25 determines the status of the static object, based on $A_{BI} - A_{CF}$.

In one embodiment wherein $\delta A_{th} \geq 0$ denotes a specified area difference threshold, step 23 determines that: (1) $A_{BI} - A_{CF} > \delta A_{th}$, which means that the status is the abandoned status; (2) $A_{CF} - A_{BI} > \delta A_{th}$ which means that the status is the removed status; or (3) $|A_{BI} - A_{CF}| \leq \delta A_{th}$ which means that the status is indefinite.

In one embodiment, the preceding test using the area difference threshold is replaced by a test using a fractional threshold $\epsilon \geq 0$ wherein step 23 determines that: (1) $(A_{BI} - A_{CF})/(A_{BI} + A_{CF}) > \epsilon$ which means that the status is the abandoned status; (2) $(A_{CF} - A_{BI})/(A_{BI} + A_{CF}) \leq \epsilon$ which means that the status is the removed status; or (3) $|(A_{BI} - A_{CF})|/(A_{BI} + A_{CF}) \leq \epsilon$ which means that the status is indefinite.

Whenever the discussion infra of the present invention discusses the test involving $\delta A_{th}$, it should be understood that the aforementioned test involving $\epsilon$ could alternatively be utilized.

FIG. 3 is a flow chart depicting implementation of the region growing procedure used in steps 23 and 24 of FIG. 2, in accordance with embodiments of the present invention. FIG. 3 generates and outputs a growth area in an input frame supplied by a step that calls the region growing procedure. In particular, step 21 of FIG. 2 supplies the current frame to be used as the input frame by the region growing procedure, and step 22 of FIG. 2 supplies the background image to be used as the input frame by the region growing procedure. The static region is additional input to the region growing procedure. In addition, the region growing procedure may utilize a specified pixel erosion depth and seed selection parameters.

FIG. 3 depicts steps 31-33 will be described in application of the region growing procedure to an example illustrated in FIGS. 4-13.

Step 31 selects first seed pixels from the boundary pixels of the non-eroded pixels resulting from step 22 of FIG. 2 after the bounding contour and boundary pixels resulting from step 22 has been superimposed on the frame to align the non-eroded pixels determined in step 22 with the corresponding pixels of the frame. In this embodiment, the first seed pixels are independently selected for the current frame and background image, which enables the current frame and background image to select different first pixel seeds to beneficially exploit different color intensity spatial patterns in the current frame and background image. In this embodiment, the first seed pixels may be selected: first for the current frame and subsequently for the background image; first for the background image and subsequently for the current frame; or concurrently for the current frame and the background image (e.g., if parallel processing hardware is being used).

Alternatively, the first seed pixels for the frame presently being processed (e.g., the background image) may be selected in step 31 to consist of previously selected first seed pixels from a prior execution of step 31 for another frame (e.g., the current frame) using the same boundary pixels and contour as is being used in the execution of step 31 for the frame presently being processed. In this embodiment, the selected first seed pixels are the same first see pixels for the current frame and background image, which reduces the computational cost of selecting the first pixel seeds for the current frame and background image. In this embodiment, the first seed pixels may be selected first for the current frame and subsequently for the background image, or first for the background image and subsequently for the current frame, but cannot be selected concurrently for the current frame and the background image.

Step 32 iteratively grows the first seed pixels outside the non-eroded pixels to create new seed pixels at neighbor pixels of the first seed pixels, at those neighbor pixels whose color intensity matches the color intensity of the first seed pixels according to a specified color matching criterion. Said iteratively growing creates new seed pixels at the neighbor pixels in successive generations of new seed pixel creation until additional new seed pixels cannot be created.

Step 33 determines the output growth area as a composite area of the new seed pixels.

FIGS. 4-8 and 9-13 illustrate application of the static region mask eroding step 22 of FIG. 2 in conjunction with the region growing procedure of FIG. 3 to a first input frame and to a second input frame, respectively, in accordance with embodiments of the present invention.

In the following example in which a static object that is detected is an abandoned object, the first input frame in FIGS. 4-8 is the current frame 40 and the second input frame in FIGS. 9-13 is the background image 50.

Figure 4:
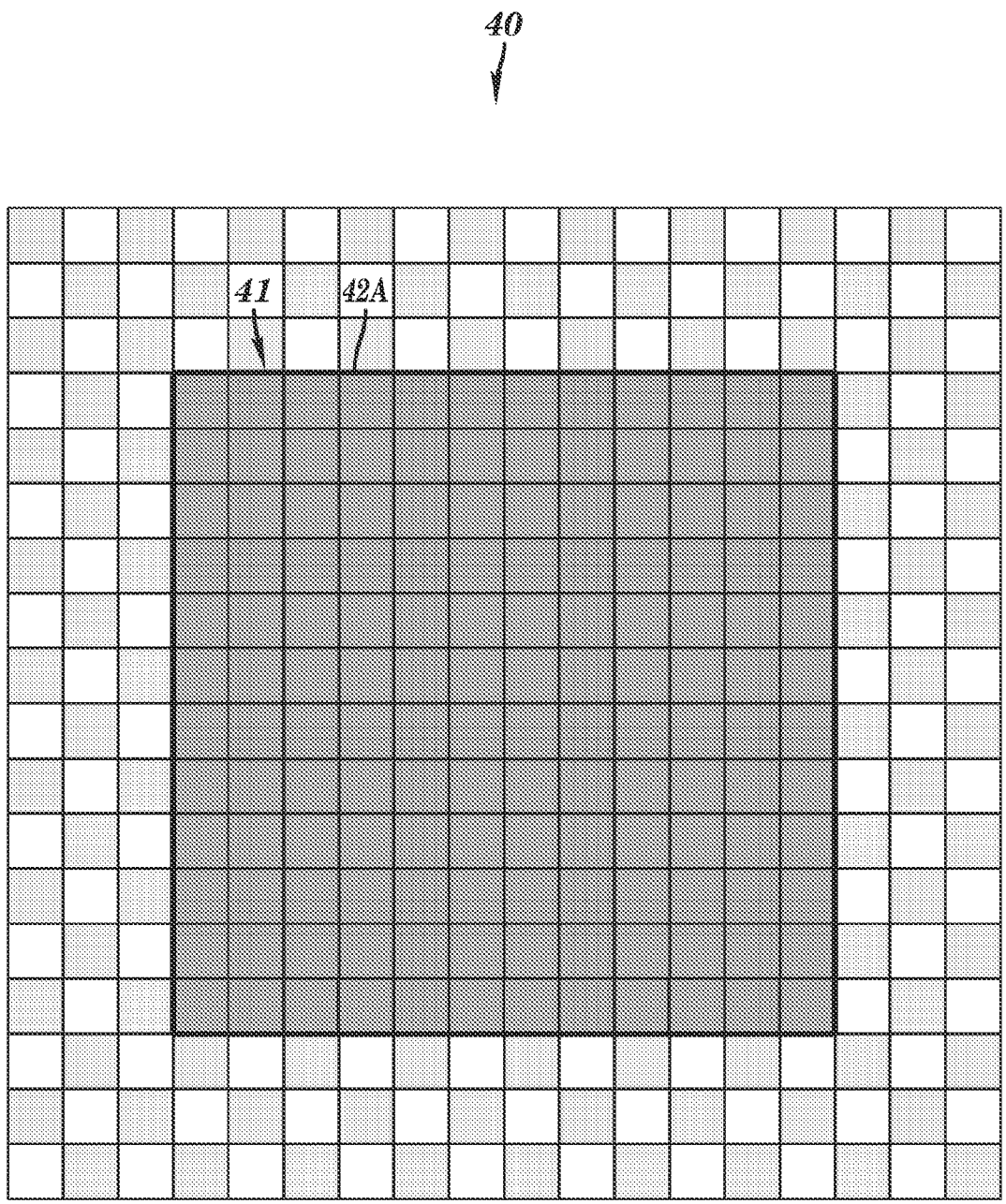
FIGS. 4-8 and 9-13 illustrate application of the region growing procedure of FIG. 3 to a first input frame and to a second input frame, respectively, in accordance with embodiments of the present invention.

In FIG. 4, the static region 41 having an outer boundary 42A in the current frame 40 is identified from step 21 of FIG. 2.

Figure 5:
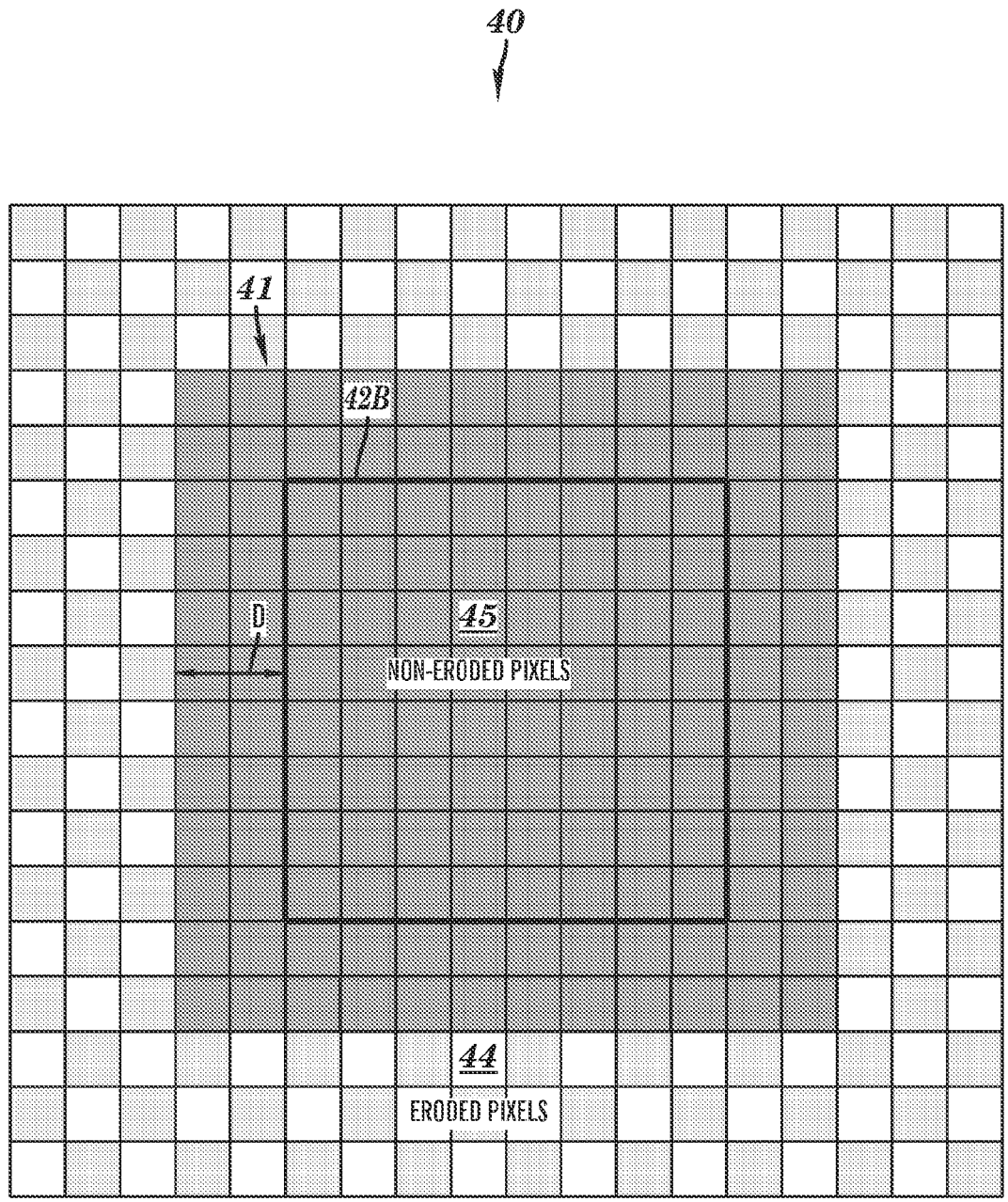

FIG. 5 depicts the result of an erosion process implemented by step 22 of FIG. 2, wherein outer pixels of the static region 41 of FIG. 4 have been eroded and are referred to as eroded pixels 44, leaving remaining non-eroded pixels 45 of the static region 41. The erosion process does not change the static region 41, but rather moves the outer boundary 42A of FIG. 4 inward within the static region 41 to become a contour 42B that is disposed totally within the static region 41 and bounds the non-eroded pixels 45. Boundary pixels 46 (see FIG. 6) of the non-eroded pixels 45 consist of all non-eroded pixels directly exposed to at least one eroded pixel 44.

In one embodiment, the process of moving boundary 42A of FIG. 4 inward within the static region 41 to become the contour 42B may be accomplished by circumferentially eroding outer pixels of the static region 41 to a pixel erosion depth D expressed as a number of pixel layers to be eroded. A pixel erosion depth D of 2 is used in the present example to generate contour 42B through an inward movement of the boundary 42A by 2 pixels.

In one embodiment, the value of the pixel erosion depth is constrained to ensure a sufficient number of boundary pixels in step 32 of FIG. 3. In other words, if the static object has a too small number of pixels, an excessively large pixel erosion depth will result in too few first seed pixels to iteratively grow sufficiently to calculate $A_{CF}$ with sufficient accuracy to satisfy $|A_{BI}-A_{CF}|>\delta A_{th}$, and similar threshold tests discussed supra.

Figure 6:
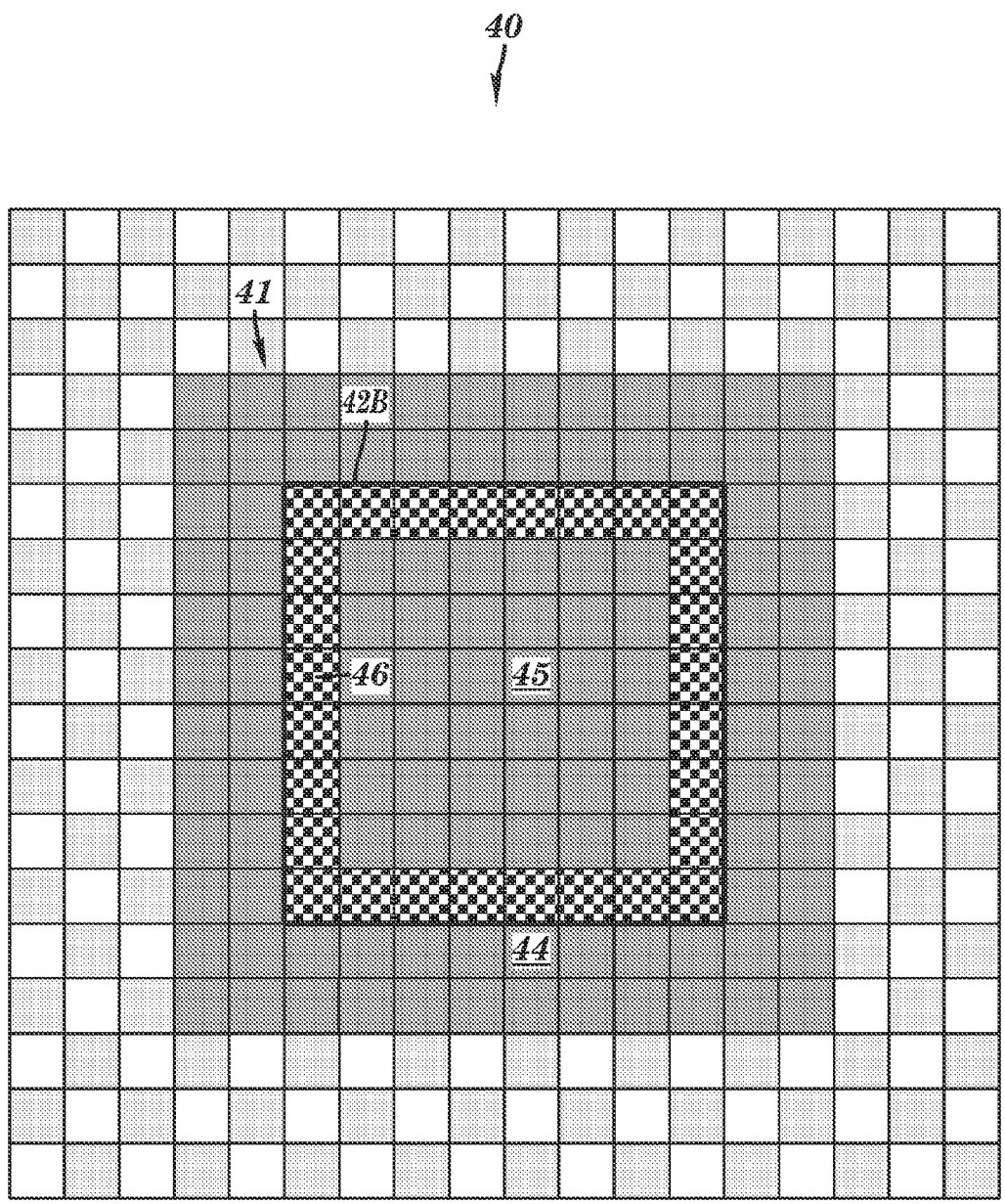

FIG. 6 depicts FIG. 5 with the 28 boundary pixels 46 of the non-eroded pixels 45 being specifically marked.

Figure 7:
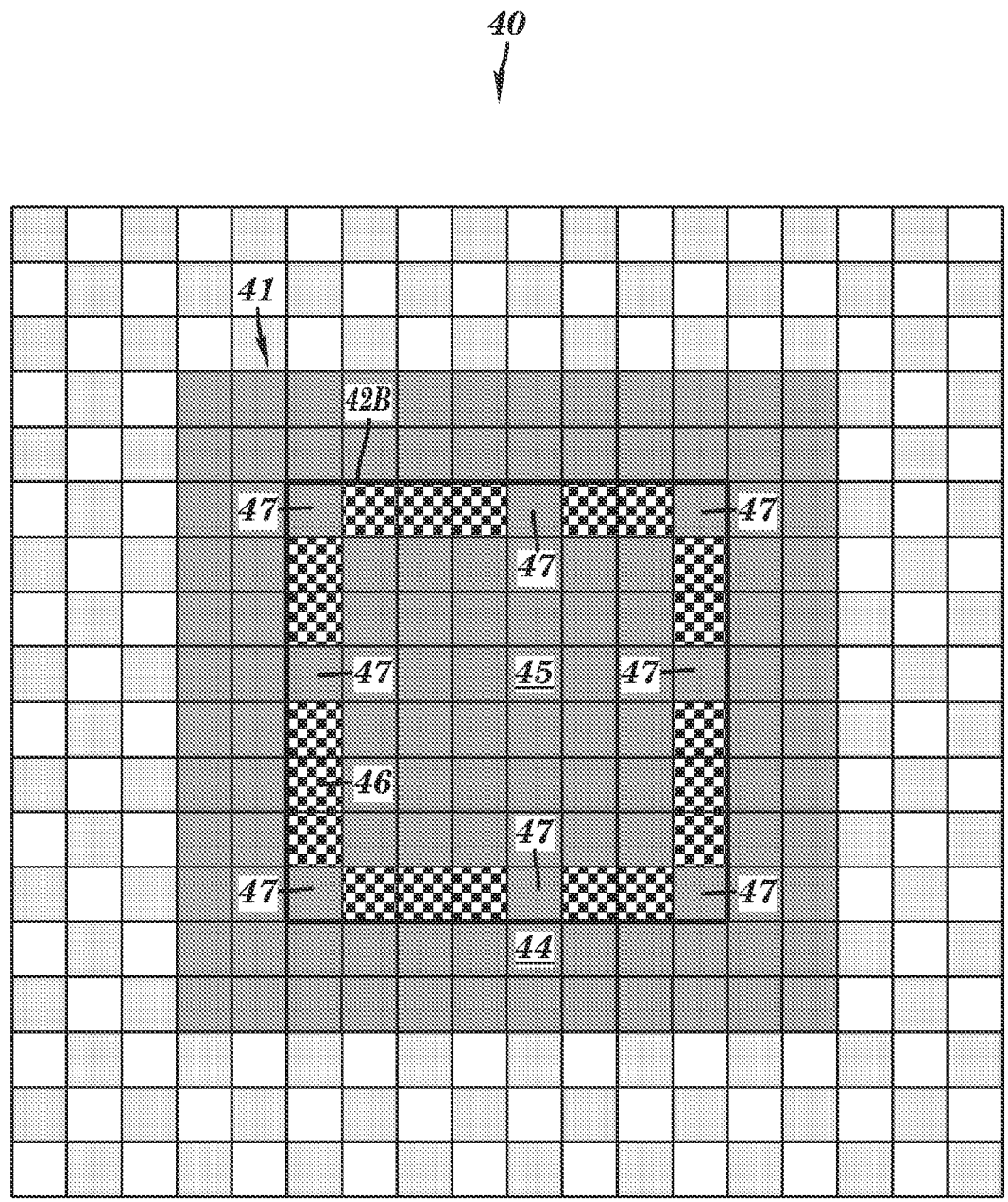

FIG. 7 depicts first seed pixels 47 that have been selected from the boundary pixels 46 in step 31 of FIG. 3. In one embodiment, the selected first seed pixels consist of all boundary pixels (e.g., all 28 boundary pixels 46 depicted in FIG. 6). In one embodiment, the selected first seeds consist of fewer pixels than the total number of boundary pixels, as in FIG. 7 which depicts 8 first seed pixels 47 that were selected from the 28 boundary pixels 46. In one embodiment, the first seed pixels 47 may be about uniformly distributed within the boundary pixels 46 as in FIG. 7. In one embodiment, the first seed pixels 47 may be non-uniformly distributed within the boundary pixels.

In one embodiment, the first seed pixels 47 may be selected to be color mismatched with at least one boundary pixel that is a neighbor pixel thereof. Color matching (or mismatching) is in accordance with a color matching criterion. A "neighbor pixel" to a given pixel is a pixel that directly touches the given pixel anywhere at the given pixel, even if only at a single point of the given pixel.

The preceding embodiment may be implemented by selecting one boundary pixel as a first seed pixel, either at a randomly selected boundary pixel or at a specifically selected boundary pixel. From this one boundary pixel, the procedure moves systematically (e.g., clockwise or counterclockwise) to the neighbor boundary pixels of this one boundary pixel in succession and tests for a color mismatch with each neighbor boundary pixel until a color mismatch is detected. If there is a color match with a neighbor boundary pixel, then the color-matched neighbor boundary pixel is not selected as a first seed pixel. If there is a color mismatch with a neighbor boundary pixel, then the color-mismatched neighbor boundary pixel is selected as the next first seed pixel. From this next first seed pixel, the procedure moves systematically to the next neighbor boundary pixels in succession and performs the preceding tests for color mismatch, until all boundary pixels have been processed in the preceding manner. For example, if the boundary pixels consist of successive boundary pixels P1 (blue), P2 (blue), P3 (red), P4 (red), P5 (red), P6 (red), P7 (green), P8 (green), and if the selected first seed pixel is P1, then the selected first seed pixels are P1, P3, P7, and P8. This embodiment is efficient for selecting first seed pixels to reduce computation cost.

In one embodiment, a color matching criterion is that a first pixel and a second pixel are color matched if their respective color intensities fall within a same range of color intensities that has been specified as a "color class". A color class consists of a specified set of discrete colors. The totality of color classes encompasses all possible color intensities in the color spectrum being used, and each color class consists of a subset of said all possible color intensities. Thus, the first pixel and the second pixel are color matched according to the preceding color matching criterion if their respective color intensities fall within a same color class. The first pixel and the second pixel are color mismatched if their respective color intensities do not fall within a same color class. Therefore, any two pixels are either color matched or color mismatched. From another point of view, the first pixel and the second pixel are color matched according to the preceding color matching criterion if their respective color intensities fall within a same color class.

Figure 8:
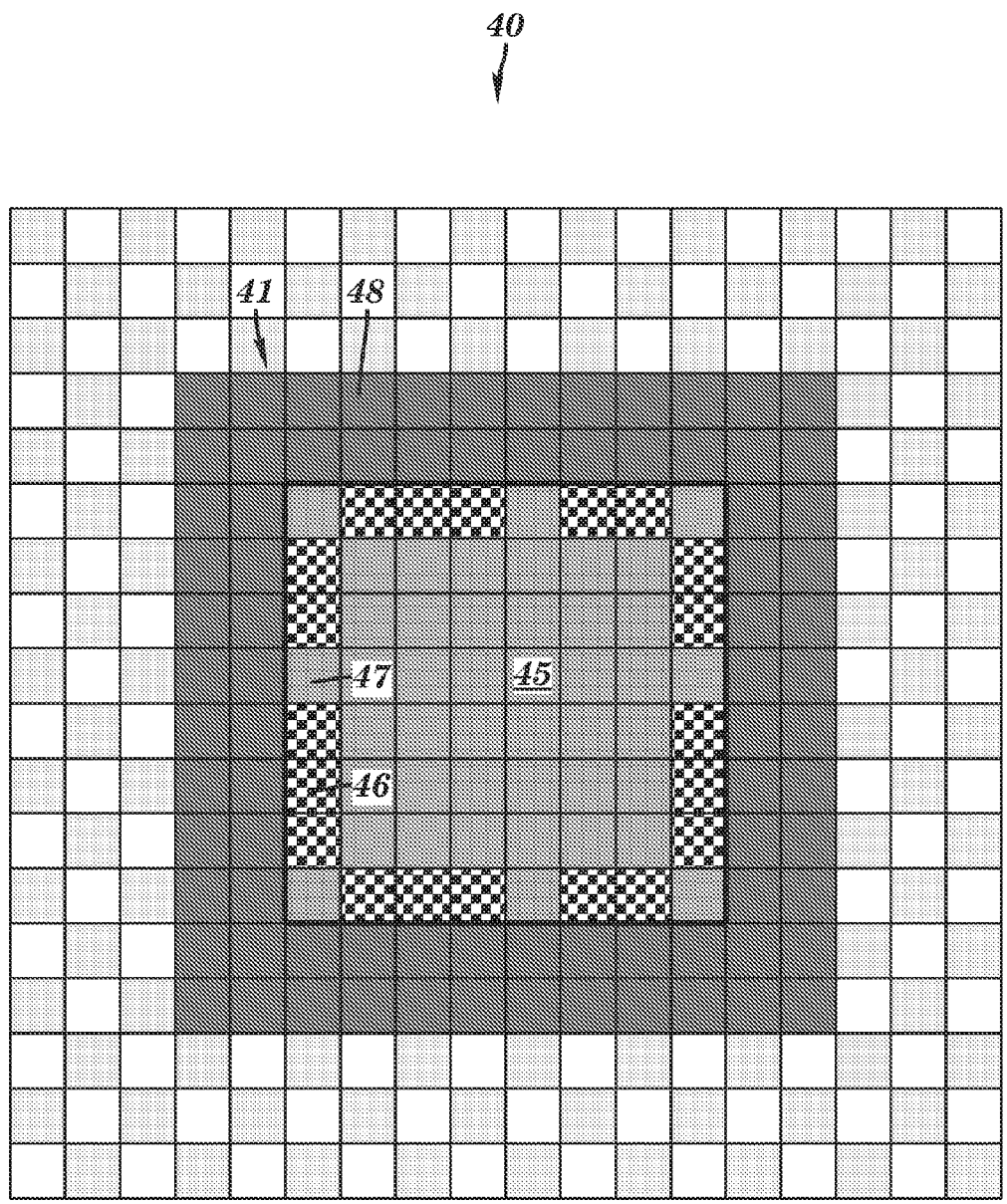

FIG. 8 depicts the result of step 32 of FIG. 3 of iterative growth of the first seed pixels 47 outside the non-eroded pixels 45 to create new seed pixels at neighbor pixels thereof whose color intensity matches the color intensity of the first seed pixels according to a specified color matching criterion. Each neighbor pixel that has been color matched with a first seed pixel becomes a new seed pixel and is subsequently color matched with its neighbor pixels according to the specified color matching criterion. This process continues to iteratively create new seed pixels until additional new seed pixels cannot be created, resulting in a growth region 48 whose associated growth area $A_{CF}$ is computed in step 33 of FIG. 3 by adding the areas of the individual new seed pixels. If the area of each pixel is 1, then $A_{CF}$=80 for growth region 48 in FIG. 7.

Figure 9:
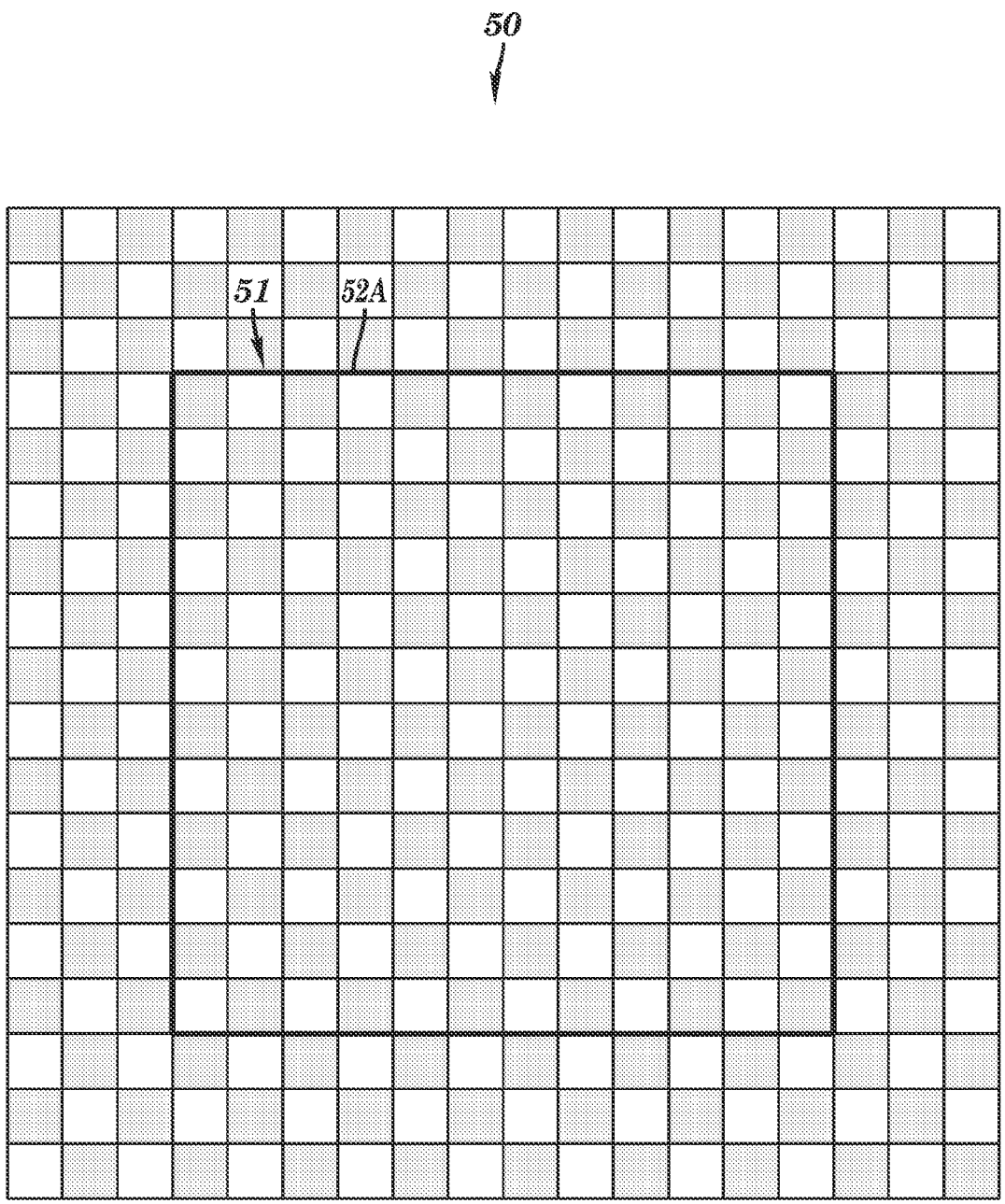

In FIG. 9, the static region 51 having an outer boundary 52A in the background image 50 is identified from step 21 of FIG. 2.

Figure 10:
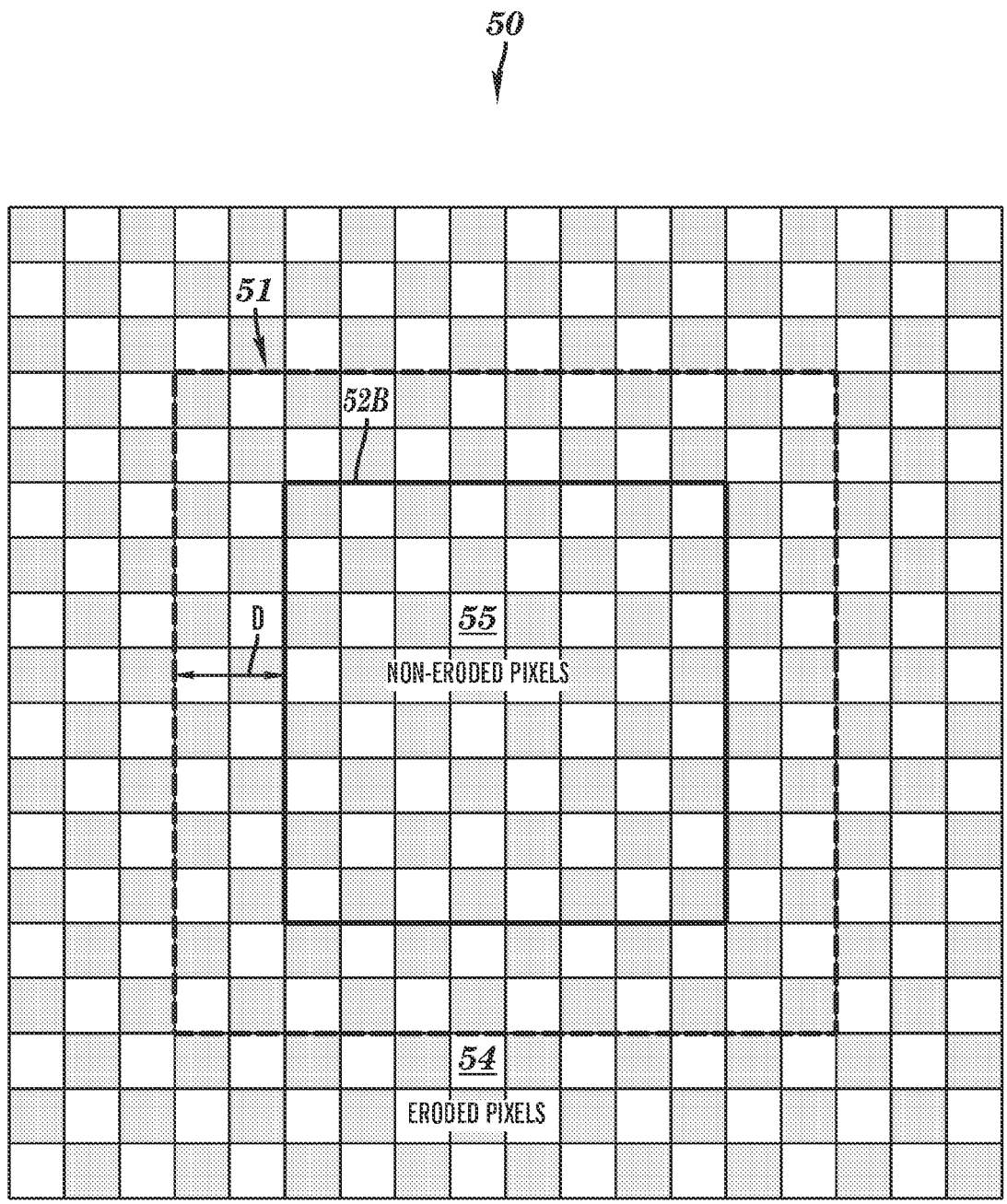

FIG. 10 depicts the result of an erosion process implemented by step 22 of FIG. 2, wherein outer pixels of the static region 51 of FIG. 4 have been eroded and are referred to as eroded pixels 54, leaving remaining non-eroded pixels 55 of the static region 51. The erosion process does not change the static region 51, but rather moves the outer boundary 52A of FIG. 9 inward within the static region 51 to become a contour 52B that is disposed totally within the static region 51 and bounds the non-eroded pixels 55. The contour 52B in FIG. 10 and the contour 42B of FIG. 5 are geometrically congruent with respect to each other and are disposed in the same relative spatial locations in the current frame 10 and the background image 40, respectively, because the same step 22 of FIG. 2 was used to generate a contour that is used for both the contours 42B and the contour 52B. Boundary pixels 56 (see FIG. 11) of the non-eroded pixels 55 consist of all non-eroded pixels directly exposed to at least one eroded pixel 54.

In one embodiment, the process of moving boundary 52A of FIG. 9 inward within the static region 51 to become the contour 52B may be accomplished by circumferentially eroding outer pixels of the static region 51 to a pixel erosion depth D expressed as a number of pixel layers to be eroded. A pixel erosion depth D of 2 is used in the present example to generate contour 52B through an inward movement of the boundary 52A by 2 pixels.

In one embodiment, the pixel erosion depth is constrained to be sufficiently large to ensure the condition that $|A_{BI}-A_{CF}|$ exceeds the specified area difference threshold $\delta A_{th}$, so that the A/R algorithm could lead to an unambiguous determination of the abandoned/removed status of the static object represented by the static region. For example, the preceding condition of $|A_{BI}-A_{CF}|>\delta A_{th}$ may be due to the static object encompassing a very large fraction of the area of the current input frame.

In one embodiment, the pixel erosion depth is constrained to be sufficiently small to ensure a sufficient number of boundary pixels in step 32 of FIG. 3 to avoid induced color growth inhibition during an iterative growing of seed pixels. In other words, if the static object has a too small number of pixels, an excessively large pixel erosion depth will result in too few first seed pixels to iteratively grow sufficiently to calculate $A_{BI}$ with sufficient accuracy to satisfy $|A_{BI}-A_{CF}|>\delta A_{th}$, and similar threshold tests discussed supra.

Figure 11:
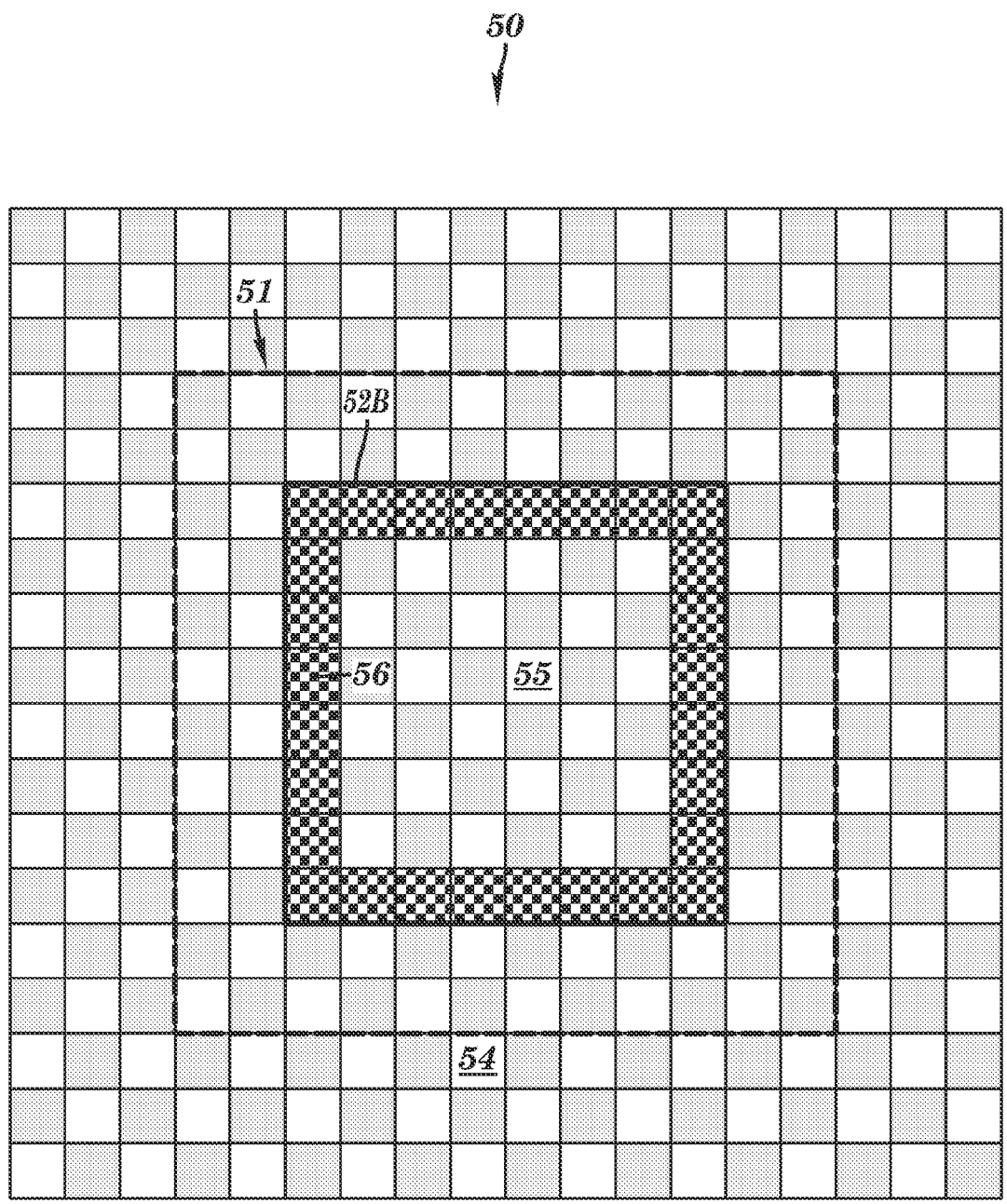

FIG. 11 depicts FIG. 10 with the 28 boundary pixels 56 of the non-eroded pixels 55 being specifically marked.

Figure 12:
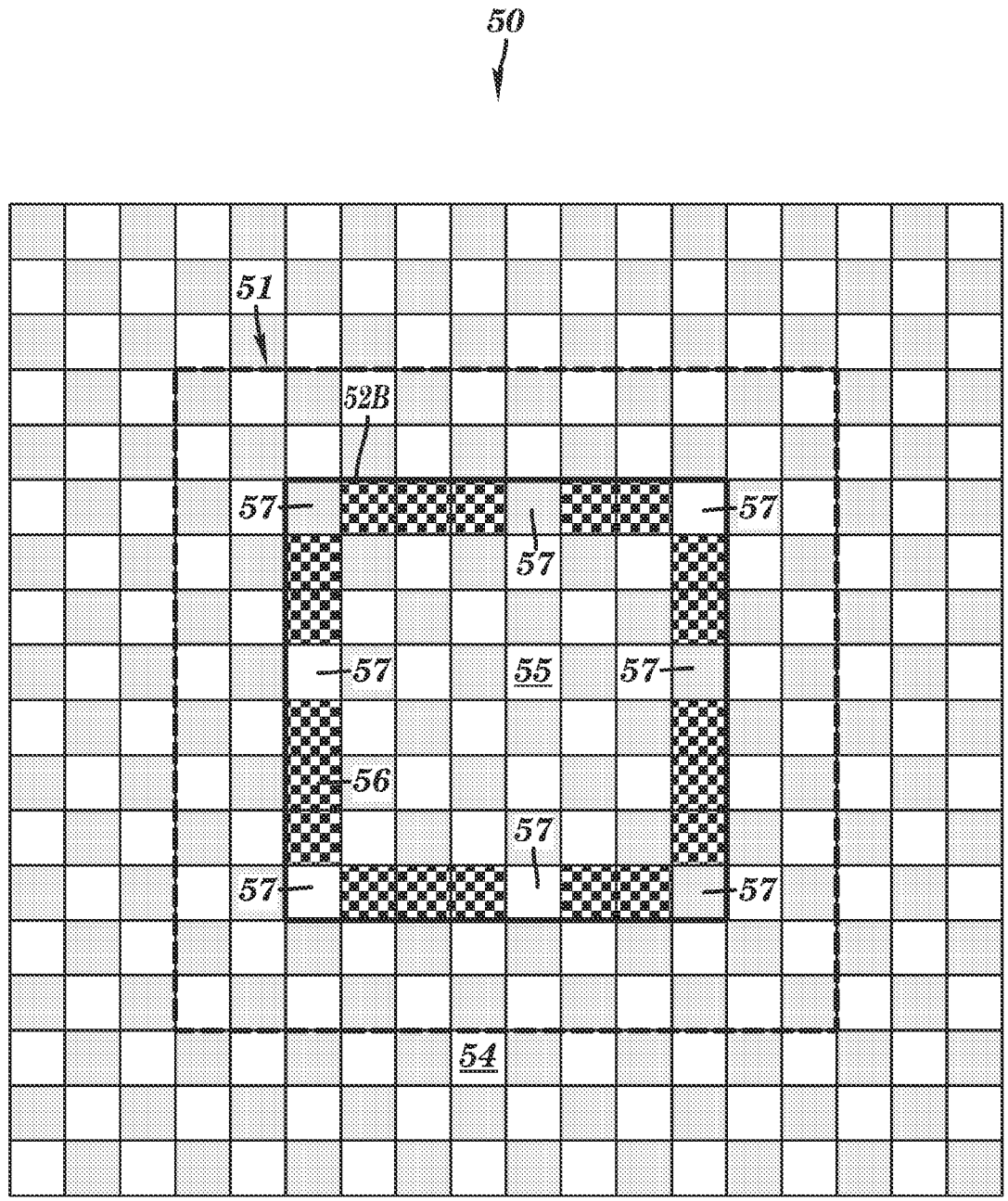

FIG. 12 depicts first seed pixels 57 that have been selected from the boundary pixels 56 in step 31 of FIG. 3 or as the first boundary seeds 47 (see FIG. 7) that were previously selected from the prior execution of the region growing procedure of FIG. 3 for the current frame as described for FIGS. 4-8. In one embodiment, the selected first seed pixels consist of all boundary pixels (e.g., all 28 boundary pixels 56 depicted in FIG. 11). In one embodiment, the selected first seeds consist of fewer pixels than the total number of boundary pixels, as in FIG. 12 which depicts 8 first seed pixels 57 that were selected from the 28 boundary pixels 56. In one embodiment, the first seed pixels 57 may be about uniformly distributed within the boundary pixels 56 as in FIG. 12. In one embodiment, the first seed pixels 57 may be non-uniformly distributed within the boundary pixels.

In one embodiment, the first seed pixels 57 may be selected to be color mismatched with at least one boundary pixel that is a neighbor pixel thereof. Color matching (or mismatching) is in accordance with a color matching criterion. A "neighbor pixel" to a given pixel is a pixel that directly touches the given pixel anywhere at the given pixel, even if only at a single point of the given pixel.

The preceding embodiment may be implemented by selecting one boundary pixel as a first seed pixel, either at a randomly selected boundary pixel or at a specifically selected boundary pixel. From this one boundary pixel, the procedure moves systematically (e.g., clockwise or counterclockwise) to the neighbor boundary pixels of this one boundary pixel in succession and tests for a color mismatch with each neighbor boundary pixel until a color mismatch is detected. If there is a color match with a neighbor boundary pixel, then the color-matched neighbor boundary pixel is not selected as a first seed pixel. If there is a color mismatch with a neighbor boundary pixel, then the color-mismatched neighbor boundary pixel is selected as the next first seed pixel. From this next first seed pixel, the procedure moves systematically to the next neighbor boundary pixels in succession and performs the preceding tests for color mismatch, until all boundary pixels have been processed in the preceding manner. For example, if the boundary pixels consist of successive boundary pixels P1 (blue), P2 (blue), P3 (red), P4 (red), P5 (red), P6 (red), P7 (green), P8 (green), and if the selected first seed pixel is P1, then the selected first seed pixels are P1, P3, P7, and P8. This embodiment is efficient for selecting first seed pixels, because achieving a color match of a boundary pixel with an adjacent neighbor seed pixel does not add accuracy to the calculation of $A_{BI}$ and therefore need not result in a first seed pixel selection In one embodiment, a color matching criterion is that a first pixel and a second pixel are color matched if their respective color intensities fall within a same range of color intensities that has been specified as a "color class", as discussed supra in conjunction with FIG. 5.

Figure 13:
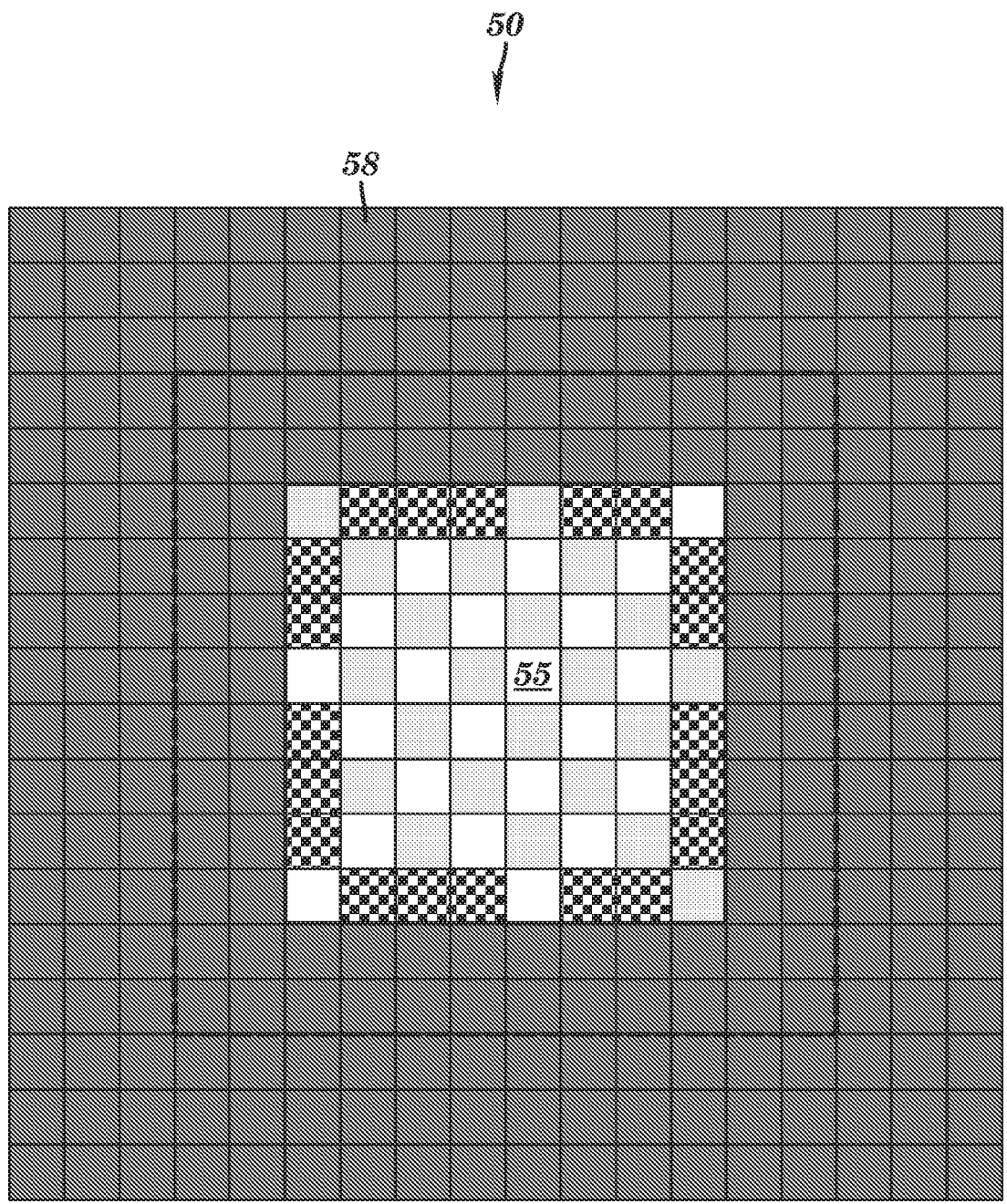

FIG. 13 depicts the result of step 32 of FIG. 3 of iterative growth of the first seed pixels 57 outside the non-eroded pixels 55 to create new seed pixels at neighbor pixels thereof whose color intensity matches the color intensity of the first seed pixels according to a specified color matching criterion. Each neighbor pixel that has been color matched with a first seed pixel becomes a new seed pixel and is subsequently color matched with its neighbor pixels according to the specified color matching criterion. This process continues to iteratively create new seed pixels until additional new seed pixels cannot be created, resulting in a growth region 58 whose associated growth area $A_{BI}$ is computed in step 33 of FIG. 3 by adding the areas of the individual new seed pixels. If the area of each pixel is 1, then $A_{BI}=260$ for growth region 58 in FIG. 7.

The preceding example illustrated in FIGS. 4-13 under the assumption that FIGS. 4-8 represent the current frame and FIGS. 9-13 represent the background image, resulted in $A_{CF}=80$ and $A_{BI}=260$. Since $A_{BI}-A_{CF}=160$ (and reasonably assuming that $\delta A_{th}<160$), the A/R algorithm determined that the static object is an abandoned object.

If alternatively FIGS. 4-8 represents the background image and FIGS. 9-13 represents the current frame, a similar analysis of FIGS. 4-13 would yield $A_{BI}=80$ and $A_{CF}=260$, leading to the conclusion that the static object is a removed object.

The A/R algorithm of the present invention has been used in a real-time smart video surveillance system. Examples and results demonstrating the effectiveness of the A/R algorithm for abandoned/removed object detection in a variety of environments are presented next.

The A/R algorithm has been used with the Pets 2006 dataset (see PETS 2006 Benchmark Data, http://www.cvg.rdg.ac.uk/PETS2006/data.html), which was designed to test abandoned object detection algorithms in a public space. The ground truth for the testing sequences include the number of persons and luggage involved in the event, and also spatial relationships between the luggage and person (to check whether the luggage is being attended or not). Persistent foreground objects are classified as abandoned items, without taking into consideration whether the object is being attended by a person or not.

The Pets dataset consists of multi-sensor sequences containing left-luggage scenarios with increasing scene complexity. There are seven different scenarios captured by four cameras from different viewpoints. The A/R algorithm is being used based on a single camera and just one of the camera views in each scenario is used, totaling seven testing sequences. The camera was chosen where the object appears bigger in the video. The whole image region is used to detect the abandoned objects. Table 1 shows obtained results for seven sequences. The scenarios are relatively simple, without many occlusions and crowds. The A/R algorithm detected all abandoned items, with zero false alarms. A static person is detected as an abandoned item in sequence S3. The static person could be removed by incorporating a person classifier.

TABLE 1

Abandoned Object Detection For 7 Pets2006 Sequences.

| # of | abandoned objects | True Positives | Static Person | False Positives |
|---|---|---|---|---|
| 7 | 7 | 7 | 1 | 0 |

The i-LIDS video library provides a benchmark to facilitate the development and selection of video detection systems (see LIDS Dataset for AVSS 2007, ftp://motinas.elec.qmul.ac.uk/pub/iLids). Evaluation of the method and system of the present invention is based on two scenarios: abandoned baggage and parked vehicles. The abandoned baggage scenario contains alarm events of unattended bags on the platform of an underground station. The parked vehicles scenario contains alarm events of suspiciously parked vehicles in an urban setting. Table 2 and Table 3 show details of the detection results. Unlike previous work in which only small regions are selected to detect the events, the whole camera view was used to detect the abandoned events. In both scenarios, all of the abandoned events (baggage and parked vehicles) were detected with low false positives. Some static people are detected as abandoned items because incorporation of a person classifier was not used. Note that a very small static water bottle is detected.

TABLE 2

Abandoned object detection for iLids dataset abandoned baggage scenario.

| # of sequence | Abandoned objects | True Positives | Static Person | False Positives |
|---|---|---|---|---|
| 5 | 8 | 8 | 9 | 4 |

TABLE 3

Parked vehicle detection for iLids dataset parked vehicle scenario.

| # of sequence | Parked Vehicle | True Positives | False Positives |
|---|---|---|---|
| 5 | 6 | 6 | 1 |

Since both Pets and iLids datasets are for abandoned object detection, a dataset that includes removed object events in different situations (retail stores, parking lot, lab, conference room, etc.) with different sizes and types of the removed objects (a bottle water, book, laptop, car etc.) were recollected. Table 4 shows the detection results. For a total of 12 removed objects, 11 objects were detected. One object is missing because the pixels of the region are randomly updated to the background model, so the region after the object was removed is not detected as a static region. The removed objects include a parked car and a laptop.

TABLE 4

Detection results for removed object detection.

| Removed Objects | True Positives | False Positives |
|---|---|---|
| 12 | 11 | 0 |

Figure 14:
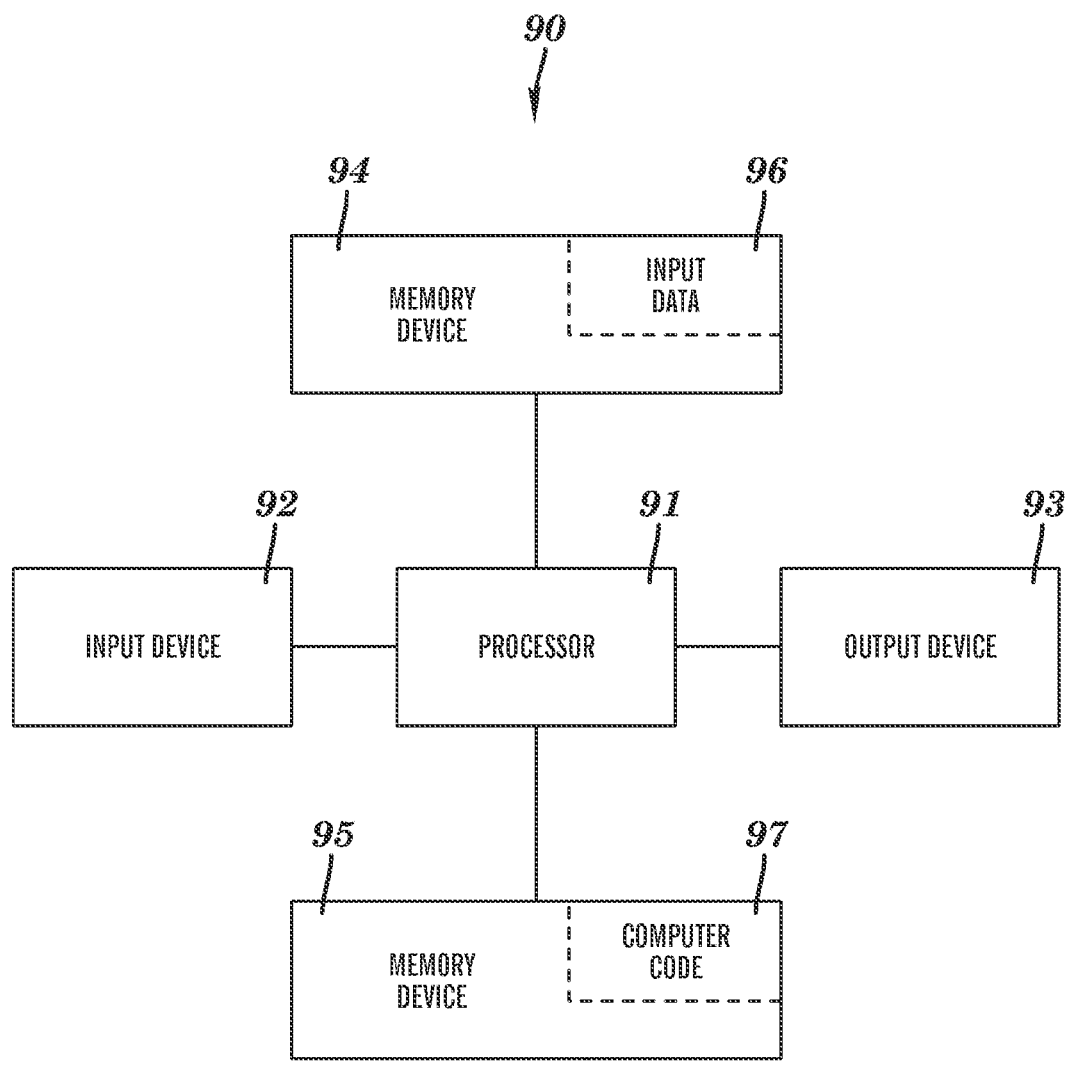
FIG. 14 illustrates a computer system used for processing a time-ordered sequence of video frames, in accordance with embodiments of the present invention.

FIG. 14 illustrates a computer system 90 used for processing a time-ordered sequence of video frames, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer display or screen, a magnetic tape, a removable hard disk, a floppy disk, etc. The memory devices 94 and 95 may be a data storage medium such as, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises program code (i.e., computer-executable instructions). The computer code 97 includes an algorithm for processing a time-ordered sequence of video frames. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 14) may be used as a computer usable storage medium (or program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

Thus the present invention discloses a process for supporting computer infrastructure, integrating, hosting, maintaining, and deploying computer-readable program code into the computer system 90, wherein the code in combination with the computer system 90 is capable of performing a method for processing a time-ordered sequence of video frames.

Any of the components of the present invention could be created, integrated, hosted, maintained, deployed, managed, serviced, supported, etc. by a service provider who offers to facilitate for processing a time-ordered sequence of video frames. Thus the present invention discloses a process for deploying or integrating computing infrastructure, comprising integrating computer-readable code into the computer system 90, wherein the code in combination with the computer system 90 is capable of performing a method for processing a time-ordered sequence of video frames.

In another embodiment, the invention provides a business method that performs the process steps of the invention on a subscription, advertising, and/or fee basis. That is, a service provider, such as a Solution Integrator, could offer to facilitate processing a time-ordered sequence of video frames. In this case, the service provider can create, integrate, host, maintain, deploy, manage, service, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 14 shows the computer system 90 as a particular configuration of hardware and software, any configuration of hardware and software, as would be known to a person of ordinary skill in the art, may be utilized for the purposes stated supra in conjunction with the particular computer system 90 of FIG. 14. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for processing a time-ordered sequence of video frames, each frame comprising a two-dimensional array of pixels and a frame-dependent color intensity at each pixel, said method implemented by execution of program code on a processor of a computer system, said method comprising:

analyzing a current frame and at least one frame occurring prior to the current frame in the sequence, said analyzing comprising performing a background subtraction on the at least one frame to determine a background image and a static region mask associated with a static region, said background image comprising the array of pixels and a background model of the at least one frame and not comprising any moving object, said static region consisting of a contiguous distribution of pixels of the array of pixels, said analyzing determining an existence of a static object consisting of either an abandoned object existing in the static region of the current frame and not existing in the static region of the background image or a removed object existing in the static region of the background image and not existing in the static region of the current frame;

after said analyzing, determining a status of the static object, said status being an abandoned status if the static object is said abandoned object or a removed status if the static object is said removed object, said determining the status comprising executing an A/R algorithm that uses the current frame, the background image, and the static region mask as input and does not use any other information derived from the background subtraction as input; and storing the determined status in a data storage medium of the computer system.

2. The method of claim 1, wherein said executing the A/R algorithm comprises:

eroding outer pixels of the static region mask, resulting in eroded pixels and leaving remaining non-eroded pixels of the static region mask, wherein boundary pixels of the non-eroded pixels consist of all non-eroded pixels directly exposed to at least one eroded pixel and are bounded by a contour consisting of an interfacial boundary between the non-eroded pixels and the eroded pixels;

executing a region growing procedure for the current frame by denoting an input frame used by the region growing procedure to be the current frame, and subsequently executing the region growing procedure, resulting in receiving a growth area $A_{CI}$ as an output growth area from said executing the region growing procedure;

executing the region growing procedure for the background image by the denoting the input frame used by the region growing procedure to be the background image and subsequently executing the region growing procedure, resulting in receiving a growth area $A_{BI}$ as the output growth area from said executing the region growing procedure;

determining the status of the static object, based on $A_{BI}-A_{CF}$;

wherein said executing the region growing procedure comprises:

selecting first seed pixels from the boundary pixels superimposed on the input frame or selecting first seed pixels as consisting of first seed pixels selected in a prior execution of the region growing procedure for another input frame;

iteratively growing the selected first seed pixels outside the non-eroded pixels to create new seed pixels at neighbor pixels thereof whose color intensity matches the color intensity of the neighbor first seed pixels according to a specified color matching criterion, said iteratively growing creating new seed pixels at the neighbor pixels in successive generations of new seed pixel creation until additional new seed pixels cannot be created;

determining the output growth area as a composite area of the new seed pixels.

3. The method of claim 2, wherein said selecting comprises independently selecting:

the first seed pixels from the boundary pixels superimposed on the current frame during said executing the region growing procedure for the current frame; and the first seed pixels from the boundary pixels superimposed on the background image during said executing the region growing procedure for the background image.

4. The method of claim 2,
wherein said selecting during said executing the region growing procedure for the current frame comprises first selecting the first seed pixels from the boundary pixels superimposed on the current frame, and wherein said selecting during said executing the region growing procedure for the background image comprises second selecting the first seed pixels for the background frame as consisting of the first seed pixels selected for the current frame during said first selecting; or
wherein said selecting during said executing the region growing procedure for the background image comprises third selecting the first seed pixels from the boundary pixels superimposed on the background image, and wherein said selecting during said executing the region growing procedure for the current frame comprises fourth selecting the first seed pixels for the current frame as consisting of the first seed pixels selected for the background image during said third selecting.

5. The method of claim 2, wherein said determining the status comprises:
determining that $A_{BI} - A_{CF} > \delta A_{th}$, followed responsively by determining that the status is the abandoned status, wherein $\delta A_{th}$ is a specified area difference threshold subject to $\delta A_{th} \geq 0$; or
determining either that $A_{CF} - A_{BI} > \delta A_{th}$, followed responsively by determining that the status is the removed status.

6. The method of claim 2, wherein said eroding comprises circumferentially eroding the outer pixels of the static region to a pixel erosion depth expressed as a number of pixel layers to be eroded.

7. The method of claim 2, wherein said selecting first seed pixels results in a total number of the first seed pixels being less than a total number of the boundary pixels.

8. The method of claim 7, wherein said selecting first seed pixels results in said first seed pixels being about uniformly distributed within the boundary pixels.

9. The method of claim 7, wherein said selecting first seed pixels results in said first seed pixels being non-uniformly distributed within the boundary pixels.

10. The method of claim 2, wherein said selecting first seed pixels constrains each selected first seed pixel to be color mismatched with at least one boundary pixel that is a neighbor pixel thereof.

11. A computer program product, comprising a computer readable, physically-tangible, storage device having a computer readable program code stored therein, said computer readable program code comprising an algorithm adapted to implement a method for processing a time-ordered sequence of video frames, each frame comprising a two-dimensional array of pixels and a frame-dependent color intensity at each pixel, said method implemented by execution of program code on a processor of a computer system, said method comprising:
analyzing a current frame and at least one frame occurring prior to the current frame in the sequence, said analyzing comprising performing a background subtraction on the at least one frame to determine a background image and a static region mask associated with a static region, said background image comprising the array of pixels and a background model of the at least one frame and not comprising any moving object, said static region consisting of a contiguous distribution of pixels of the array of pixels, said analyzing determining an existence of a static object consisting of either an abandoned object existing in the static region of the current frame and not existing in the static region of the background image or a removed object existing in the static region of the background image and not existing in the static region of the current frame;
after said analyzing, determining a status of the static object, said status being an abandoned status if the static object is said abandoned object or a removed status if the static object is said removed object, said determining the status comprising executing an A/R algorithm that uses the current frame, the background image, and the static region mask as input and does not use any other information derived from the background subtraction as input; and
storing the determined status in a data storage medium of the computer system.

12. The computer program product of claim 11, wherein said executing the A/R algorithm comprises:
eroding outer pixels of the static region mask, resulting in eroded pixels and leaving remaining non-eroded pixels of the static region mask, wherein boundary pixels of the non-eroded pixels consist of all non-eroded pixels directly exposed to at least one eroded pixel and are bounded by a contour consisting of an interfacial boundary between the non-eroded pixels and the eroded pixels;
executing a region growing procedure for the current frame by denoting an input frame used by the region growing procedure to be the current frame, and subsequently executing the region growing procedure, resulting in receiving a growth area $A_{CI}$ as an output growth area from said executing the region growing procedure;
executing the region growing procedure for the background image by the denoting the input frame used by the region growing procedure to be the background image and subsequently executing the region growing procedure, resulting in receiving a growth area $A_{BI}$ as the output growth area from said executing the region growing procedure;
determining the status of the static object, based on $A_{BI} - A_{CF}$;
wherein said executing the region growing procedure comprises:
selecting first seed pixels from the boundary pixels superimposed on the input frame or selecting first seed pixels as consisting of first seed pixels selected in a prior execution of the region growing procedure for another input frame;
iteratively growing the selected first seed pixels outside the non-eroded pixels to create new seed pixels at neighbor pixels thereof whose color intensity matches the color intensity of the neighbor first seed pixels according to a specified color matching criterion, said iteratively growing creating new seed pixels at the neighbor pixels in successive generations of new seed pixel creation until additional new seed pixels cannot be created;
determining the output growth area as a composite area of the new seed pixels.

13. The computer program product of claim 12, wherein said selecting comprises independently selecting:
the first seed pixels from the boundary pixels superimposed on the current frame during said executing the region growing procedure for the current frame; and the first seed pixels from the boundary pixels superimposed on the background image during said executing the region growing procedure for the background image.

14. The computer program product of claim 12,
wherein said selecting during said executing the region growing procedure for the current frame comprises first selecting the first seed pixels from the boundary pixels superimposed on the current frame, and wherein said selecting during said executing the region growing procedure for the background image comprises second selecting the first seed pixels for the background frame as consisting of the first seed pixels selected for the current frame during said first selecting; or
wherein said selecting during said executing the region growing procedure for the background image comprises third selecting the first seed pixels from the boundary pixels superimposed on the background image, and wherein said selecting during said executing the region growing procedure for the current frame comprises fourth selecting the first seed pixels for the current frame as consisting of the first seed pixels selected for the background image during said third selecting.

15. The computer program product of claim 12, wherein said determining the status comprises:
determining that $A_{BI} - A_{CF} > \delta A_{th}$, followed responsively by determining that the status is the abandoned status, wherein $\delta A_{th}$ is a specified area difference threshold subject to $\delta A_{th} \geq 0$; or
determining either that $A_{CF} - A_{BI} > \delta A_{th}$, followed responsively by determining that the status is the removed status.

16. A computer system comprising a processor and a computer readable memory unit coupled to the processor, said memory unit containing instructions that when executed by the processor implement a method for processing a time-ordered sequence of video frames, each frame comprising a two-dimensional array of pixels and a frame-dependent color intensity at each pixel, said method implemented by execution of program code on a processor of a computer system, said method comprising:
analyzing a current frame and at least one frame occurring prior to the current frame in the sequence, said analyzing comprising performing a background subtraction on the at least one frame to determine a background image and a static region mask associated with a static region, said background image comprising the array of pixels and a background model of the at least one frame and not comprising any moving object, said static region consisting of a contiguous distribution of pixels of the array of pixels, said analyzing determining an existence of a static object consisting of either an abandoned object existing in the static region of the current frame and not existing in the static region of the background image or a removed object existing in the static region of the background image and not existing in the static region of the current frame;
after said analyzing, determining a status of the static object, said status being an abandoned status if the static object is said abandoned object or a removed status if the static object is said removed object, said determining the status comprising executing an A/R algorithm that uses the current frame, the background image, and the static region mask as input and does not use any other information derived from the background subtraction as input; and
storing the determined status in a data storage medium of the computer system.

17. The computer system of claim 16, wherein said executing the A/R algorithm comprises: eroding outer pixels of the static region mask, resulting in eroded pixels and leaving remaining non-eroded pixels of the static region mask, wherein boundary pixels of the non-eroded pixels consist of all non-eroded pixels directly exposed to at least one eroded pixel and are bounded by a contour consisting of an interfacial boundary between the non-eroded pixels and the eroded pixels;
executing a region growing procedure for the current frame by denoting an input frame used by the region growing procedure to be the current frame, and subsequently executing the region growing procedure, resulting in receiving a growth area $A_{CF}$ as an output growth area from said executing the region growing procedure;
executing the region growing procedure for the background image by the denoting the input frame used by the region growing procedure to be the background image and subsequently executing the region growing procedure, resulting in receiving a growth area $A_{BI}$ as the output growth area from said executing the region growing procedure;
determining the status of the static object, based on $A_{BI} - A_{CF}$;
wherein said executing the region growing procedure comprises:
selecting first seed pixels from the boundary pixels superimposed on the input frame or selecting first seed pixels as consisting of first seed pixels selected in a prior execution of the region growing procedure for another input frame;
iteratively growing the selected first seed pixels outside the non-eroded pixels to create new seed pixels at neighbor pixels thereof whose color intensity matches the color intensity of the neighbor first seed pixels according to a specified color matching criterion, said iteratively growing creating new seed pixels at the neighbor pixels in successive generations of new seed pixel creation until additional new seed pixels cannot be created;
determining the output growth area as a composite area of the new seed pixels.

18. The computer system of claim 17, wherein said selecting comprises independently selecting:
the first seed pixels from the boundary pixels superimposed on the current frame during said executing the region growing procedure for the current frame; and
the first seed pixels from the boundary pixels superimposed on the background image during said executing the region growing procedure for the background image.

19. The computer system of claim 17,
wherein said selecting during said executing the region growing procedure for the current frame comprises first selecting the first seed pixels from the boundary pixels superimposed on the current frame, and wherein said selecting during said executing the region growing procedure for the background image comprises second selecting the first seed pixels for the background frame as consisting of the first seed pixels selected for the current frame during said first selecting; or
wherein said selecting during said executing the region growing procedure for the background image comprises third selecting the first seed pixels from the boundary pixels superimposed on the background image, and wherein said selecting during said executing the region growing procedure for the current frame comprises fourth selecting the first seed pixels for the current frame as consisting of the first seed pixels selected for the background image during said third selecting.

20. The computer system of claim 17, wherein said determining the status comprises:
- determining that $A_{BI}-A_{CF}>\delta A_{th}$, followed responsively by determining that the status is the abandoned status, wherein $\delta A_{th}$ is a specified area difference threshold subject to $\delta A_{th} \geq 0$; or
- determining either that $A_{CF}-A_{BI}>\delta A_{th}$, followed responsively by determining that the status is the removed status.

21. A process for supporting computer infrastructure, said process comprising providing at least one support service for at least one of creating, integrating, hosting, maintaining, and deploying computer-readable program code in a computing system, wherein the program code in combination with the computing system is configured to perform a method for processing a time-ordered sequence of video frames, each frame comprising a two-dimensional array of pixels and a frame-dependent color intensity at each pixel, said method implemented by execution of program code on a processor of a computer system, said method comprising:
- analyzing a current frame and at least one frame occurring prior to the current frame in the sequence, said analyzing comprising performing a background subtraction on the at least one frame to determine a background image and a static region mask associated with a static region, said background image comprising the array of pixels and a background model of the at least one frame and not comprising any moving object, said static region consisting of a contiguous distribution of pixels of the array of pixels, said analyzing determining an existence of a static object consisting of either an abandoned object existing in the static region of the current frame and not existing in the static region of the background image or a removed object existing in the static region of the background image and not existing in the static region of the current frame;
- after said analyzing, determining a status of the static object, said status being an abandoned status if the static object is said abandoned object or a removed status if the static object is said removed object, said determining the status comprising executing an A/R algorithm that uses the current frame, the background image, and the static region mask as input and does not use any other information derived from the background subtraction as input; and
- storing the determined status in a data storage medium of the computer system.

22. The process of claim 21, wherein said executing the A/R algorithm comprises:
- eroding outer pixels of the static region mask, resulting in eroded pixels and leaving remaining non-eroded pixels of the static region mask, wherein boundary pixels of the non-eroded pixels consist of all non-eroded pixels directly exposed to at least one eroded pixel and are bounded by a contour consisting of an interfacial boundary between the non-eroded pixels and the eroded pixels;
- executing a region growing procedure for the current frame by denoting an input frame used by the region growing procedure to be the current frame, and subsequently executing the region growing procedure, resulting in receiving a growth area $A_{CI}$ as an output growth area from said executing the region growing procedure;
- executing the region growing procedure for the background image by the denoting the input frame used by the region growing procedure to be the background image and subsequently executing the region growing procedure, resulting in receiving a growth area $A_{BI}$ as the output growth area from said executing the region growing procedure;
- determining the status of the static object, based on $A_{BI}-A_{CF}$, wherein said executing the region growing procedure comprises:
- selecting first seed pixels from the boundary pixels superimposed on the input frame or selecting first seed pixels as consisting of first seed pixels selected in a prior execution of the region growing procedure for another input frame;
- iteratively growing the selected first seed pixels outside the non-eroded pixels to create new seed pixels at neighbor pixels thereof whose color intensity matches the color intensity of the neighbor first seed pixels according to a specified color matching criterion, said iteratively growing creating new seed pixels at the neighbor pixels in successive generations of new seed pixel creation until additional new seed pixels cannot be created;
- determining the output growth area as a composite area of the new seed pixels.

23. The process of claim 22, wherein said selecting comprises independently selecting:
- the first seed pixels from the boundary pixels superimposed on the current frame during said executing the region growing procedure for the current frame; and
- the first seed pixels from the boundary pixels superimposed on the background image during said executing the region growing procedure for the background image.

24. The process of claim 22,
- wherein said selecting during said executing the region growing procedure for the current frame comprises first selecting the first seed pixels from the boundary pixels superimposed on the current frame, and wherein said selecting during said executing the region growing procedure for the background image comprises second selecting the first seed pixels for the background frame as consisting of the first seed pixels selected for the current frame during said first selecting; or
- wherein said selecting during said executing the region growing procedure for the background image comprises third selecting the first seed pixels from the boundary pixels superimposed on the background image, and wherein said selecting during said executing the region growing procedure for the current frame comprises fourth selecting the first seed pixels for the current frame as consisting of the first seed pixels selected for the background image during said third selecting.

25. The process of claim 22, wherein said determining the status comprises:
- determining that $A_{BI}-A_{CF}>\delta A_{th}$, followed responsively by determining that the status is the abandoned status, wherein $\delta A_{th}$ is a specified area difference threshold subject to $\delta A_{th} \geq 0$; or
- determining either that $A_{CF}-A_{BI}>\delta A_{th}$, followed responsively by determining that the status is the removed status.

* * * * *